US012730178B2

(12) United States Patent
Araújo et al.

(10) Patent No.: US 12,730,178 B2
(45) Date of Patent: Sep. 8, 2026

(54) PERFORMING LOCALISATION OF A FIRST USER DEVICE

(71) Applicant: Telefonaktiebolaget LM Ericsson (publ), Stockholm (SE)

(72) Inventors: José Araújo, Stockholm (SE); Diego Gonzalez Morin, Galapagar (ES); AmirHossein Taher Kouhestani, Solna (SE); Ioannis Karagiannis, Kalamata (GR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 419 days.

(21) Appl. No.: 17/783,426

(22) PCT Filed: Dec. 11, 2019

(86) PCT No.: PCT/EP2019/084732
§ 371 (c)(1),
(2) Date: Jun. 8, 2022

(87) PCT Pub. No.: WO2021/115595
PCT Pub. Date: Jun. 17, 2021

(65) Prior Publication Data

US 2023/0012943 A1 Jan. 19, 2023

(51) Int. Cl.
*G01S 5/02* (2010.01)
*G01S 5/00* (2006.01)

(52) U.S. Cl.
CPC ............ *G01S 5/0264* (2020.05); *G01S 5/017* (2020.05)

(58) Field of Classification Search
CPC ............................... G01S 5/0264; G01S 5/017
USPC ........................................................ 340/524
See application file for complete search history.

(56) References Cited

U.S. PATENT DOCUMENTS

| | | | | |
|---|---|---|---|---|
| 9,179,263 | B2 * | 11/2015 | Willins | H04W 52/0254 |
| 9,204,257 | B1 * | 12/2015 | Mendelson | H04W 4/024 |
| 2013/0137450 | A1 * | 5/2013 | Dai | H04W 4/02 455/456.1 |
| 2013/0311080 | A1 * | 11/2013 | Wirola | G01S 5/012 701/409 |

(Continued)

OTHER PUBLICATIONS

International Search Report and Written Opinion issued in International Application No. PCT/EP2019/084732, dated Sep. 7, 2020 (11 pages).

(Continued)

*Primary Examiner* — Zhen Y Wu
(74) *Attorney, Agent, or Firm* — Sage Patent Group

(57) ABSTRACT

It is provided a method for performing localisation of a first user device comprising an environment sensor. The method is performed in a localisation determiner and comprising the steps of: determining a dynamicity parameter indicating an extent of environment dynamicity for the first user device; determining when the dynamicity parameter indicates that the first user device is in a dynamic environment; triggering localisation to occur using localisation procedures of a cellular network to which the first user device is connected, when the first user device is determined to be in a dynamic environment; and triggering localisation to occur using at least one environment sensor of the first user device when the first user device is determined to not be in a dynamic environment.

18 Claims, 2 Drawing Sheets

(56) References Cited

U.S. PATENT DOCUMENTS

| | | | | |
|---|---|---|---|---|
| 2014/0073349 | A1 | 3/2014 | Schunk | |
| 2014/0114568 | A1* | 4/2014 | Park | G01S 19/48 701/469 |
| 2014/0237400 | A1* | 8/2014 | Higgins | G06F 3/04845 715/765 |
| 2014/0279790 | A1* | 9/2014 | Ramachandran | G06N 7/01 706/46 |
| 2015/0097731 | A1* | 4/2015 | Russell | G01S 5/012 342/450 |
| 2016/0069690 | A1* | 3/2016 | Li | G01C 21/206 701/411 |
| 2017/0048678 | A1* | 2/2017 | Hong | H04W 4/029 |
| 2019/0182622 | A1* | 6/2019 | Cerchio | G01C 21/206 |

OTHER PUBLICATIONS

Wang, C., et al., "Ultra-Wideband Aided Fast Localization and Mapping System", arXiv:1710.00156v1 [cs.RO] Sep. 30, 2017 (8 pages).

Yu, C., et al., "DS-SLAM: A Semantic Visual SLAM towards Dynamic Environments," Dec. 2018 (9 pages).

* cited by examiner

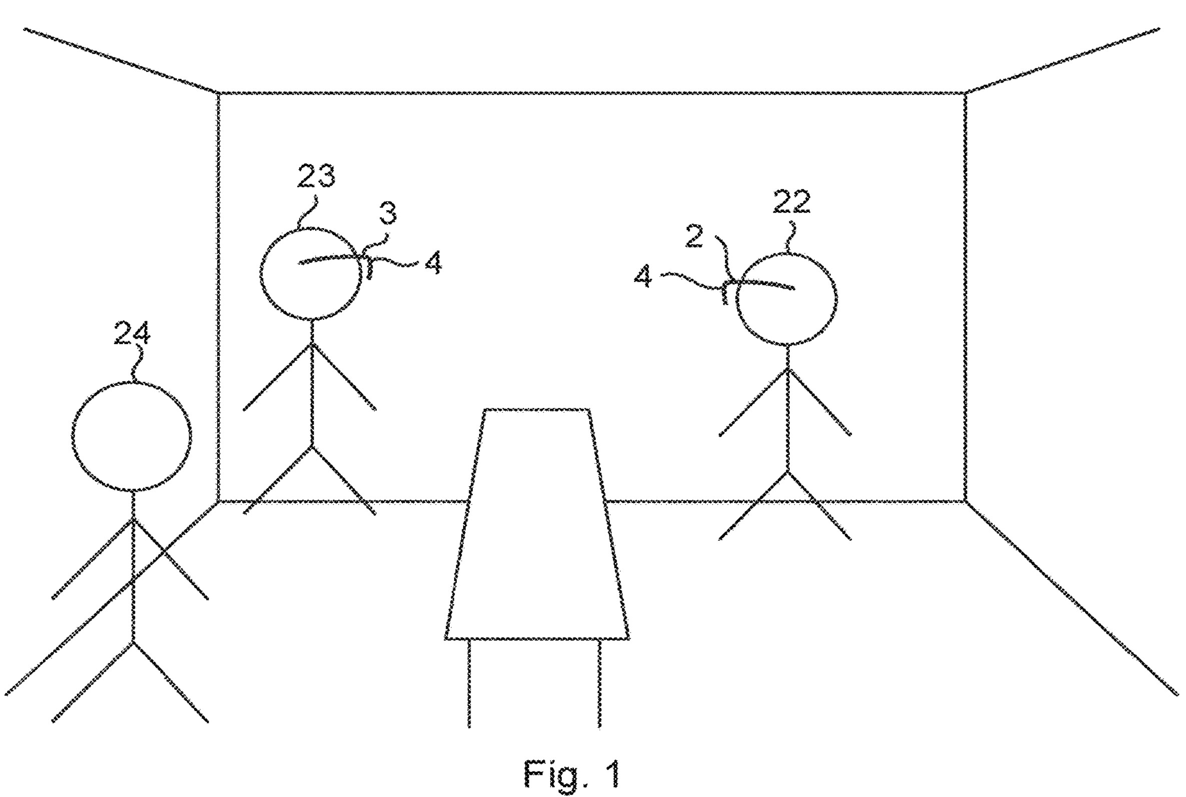
Fig. 1
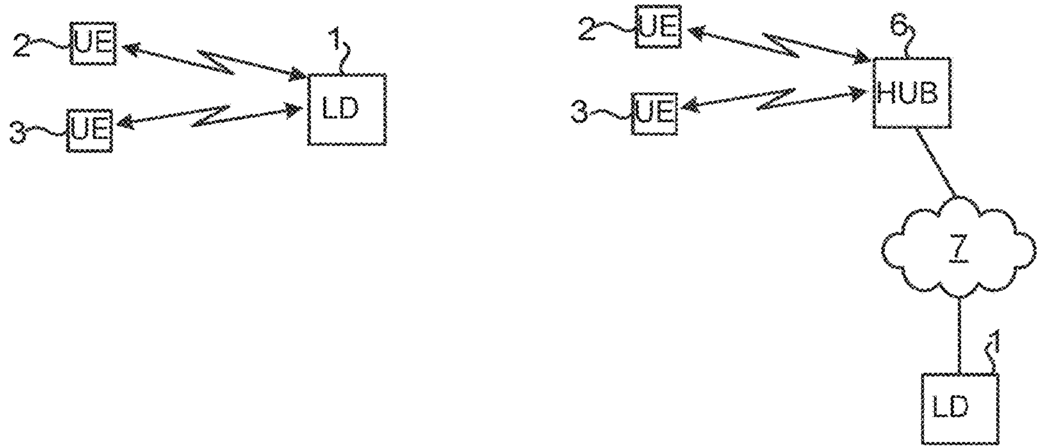
Fig. 2A
Fig. 2B

PERFORMING LOCALISATION OF A FIRST USER DEVICE

CROSS REFERENCE TO RELATED APPLICATION(S)

This application is a 35 U.S.C. § 371 National Stage of International Patent Application No. PCT/EP2019/084732, filed Dec. 11, 2019.

TECHNICAL FIELD

The present disclosure relates to the field of performing localisation of a user device.

BACKGROUND

Mixed reality (MR) is foreseen to become an integral technology in the networked society and potently disrupt the consumer electronics market. Mixed reality encompasses Augmented Reality (AR) and Augmented Virtuality (AV).

AR is here used to denote the concept of presenting a combination of real-world objects and computer-rendered content to a user. Specifically, one implementation of AR implies layering one or more virtual objects in front of reality, on a user view of the world via a user device in the form of a see-through Head Mounted Display (HMD). One application of AR is to allow users to see and interact remotely and in 3D (three dimensions), as if each participant share the same physical space. Hence, remote communication and interaction could become as natural as face-to-face communication. In AV, the user sees real-world objects as captured by an HMD camera, and subsequently presented on the display together with computer-rendered content. Hence, in AV, the display is non see-through.

For MR, the user device needs to be accurately localised, e.g. to determine correct positions for computer-rendered content. One known way to obtain localisation of a user device is SLAM (Simultaneous Localisation and Mapping), where the user device simultaneously maps its environment and determines its location within this environment, using one or more environment sensors (e.g. camera, LIDAR, etc.) of the user device. Localisation of user devices can also be applied for many other scenarios, e.g. for indoor navigation, etc.

Performing environment-based SLAM in a dynamic environment is a hard problem since vision-based localisation and mapping algorithms highly rely on static environment features in the environment and is thus not appropriate for dynamic environments.

In the paper "DS-SLAM: A Semantic Visual SLAM towards Dynamic Environments", Yu et al, 2018 IEEE/RSJ International Conference on Intelligent Robots and Systems (IROS 2018), DOI 10.1109/IROS.2018. 8593691, it is disclosed localisation in a dynamic environment based on a semantic understanding of the environment, performing object detection and classification, and detecting which are potentially static regions from which visual features should be extracted and used. However, this approach is computationally demanding since the analysis is required of visual information at high repetition rates, and require proper understanding of what potentially dynamic objects are. Moreover, this approach relies on usage of visual (and inertial) measurements, which will still fail in case the environment has very few regions with static visual features.

SUMMARY

One object is to provide an improved way of performing localisation of a user device in a dynamic environment.

According to a first aspect, it is provided a method for performing localisation of a first user device comprising an environment sensor. The method is performed in a localisation determiner and comprising the steps of: determining a dynamicity parameter indicating an extent of environment dynamicity for the first user device; determining when the dynamicity parameter indicates that the first user device is in a dynamic environment; triggering localisation to occur using localisation procedures of a cellular network to which the first user device is connected, when the first user device is determined to be in a dynamic environment; and triggering localisation to occur using at least one environment sensor of the first user device when the first user device is determined to not be in a dynamic environment.

Environment sensor-based localisation performs better in relatively static environments while cellular based localisation performs well in dynamic environments. Moreover, the cellular based localisation reduces the power usage in the user device, compared to localisation based on the environment sensor(s).

The step of determining the dynamicity parameter may comprise determining the dynamicity parameter based on data received from a cellular network to which the first user device is connected.

The step of determining when the dynamicity parameter indicates that the first user device is in a dynamic environment may be based on comparing the dynamicity parameter with a threshold value.

The step of determining a dynamicity parameter may comprise determining the dynamicity parameter based on a current number of user devices in the vicinity of the first user device.

The step of determining a dynamicity parameter may comprise determining the dynamicity parameter based on motion properties of the user devices in the vicinity of the first user device.

The step of determining a dynamicity parameter may comprise determining the dynamicity parameter based on motion properties of the first user device.

The step of determining a dynamicity parameter may comprise determining the dynamicity parameter based on multiple corresponding input parameters collected over time.

The step of determining a dynamicity parameter may comprise determining the dynamicity parameter based on a prediction of movement of the first user device.

The step of triggering localisation to occur using localisation procedures of a cellular network may comprise controlling radio communication in the cellular network to improve localisation of the first user device using the cellular network.

The step of triggering localisation to occur using localisation procedures of a cellular network may comprise determining a relative location between the first user device and a second user device, wherein the second user device is localised using at least one environment sensor of the second user device.

The step of triggering localisation to occur using at least one environment sensor of the first user device may comprise providing data on dynamicity of different regions to the first user device.

The environment sensor may be a visual sensor.

According to a second aspect, it is provided a localisation determiner for performing localisation of a first user device comprising an environment sensor. The localisation determiner comprises: a processor; and a memory storing instructions that, when executed by the processor, cause the localisation determiner to: determine a dynamicity parameter indicating an extent of environment dynamicity for the first user device; determine when the dynamicity parameter indicates that the first user device is in a dynamic environment; trigger localisation to occur using localisation procedures of a cellular network to which the first user device is connected, when the first user device is determined to be in a dynamic environment; and trigger localisation to occur using at least one environment sensor of the first user device when the first user device is determined to not be in a dynamic environment.

The instructions to determine the dynamicity parameter may comprise instructions that, when executed by the processor, cause the localisation determiner to determine the dynamicity parameter based on data received from a cellular network to which the first user device is connected.

The instructions to determine when the dynamicity parameter indicates that the first user device is in a dynamic environment may comprise instructions that, when executed by the processor, cause the localisation determiner to determine the dynamicity parameter based on comparing the dynamicity parameter with a threshold value.

The instructions to determine a dynamicity parameter may comprise instructions that, when executed by the processor, cause the localisation determiner to determine the dynamicity parameter based on a current number of user devices in the vicinity of the first user device.

The instructions to determine a dynamicity parameter may comprise instructions that, when executed by the processor, cause the localisation determiner to determine the dynamicity parameter based on motion properties of the user devices in the vicinity of the first user device.

The instructions to determining a dynamicity parameter may comprise instructions that, when executed by the processor, cause the localisation determiner to determine the dynamicity parameter based on motion properties of the first user device.

The instructions to determining a dynamicity parameter may comprise instructions that, when executed by the processor, cause the localisation determiner to determine the dynamicity parameter based on multiple corresponding input parameters collected over time.

The instructions to determine a dynamicity parameter may comprise instructions that, when executed by the processor, cause the localisation determiner to determine the dynamicity parameter based on a prediction of movement of the first user device.

The instructions to trigger localisation to occur using localisation procedures of a cellular network may comprise instructions that, when executed by the processor, cause the localisation determiner to control radio communication in the cellular network to improve localisation of the first user device using the cellular network.

The instructions to trigger localisation to occur using localisation procedures of a cellular network may comprise instructions that, when executed by the processor, cause the localisation determiner to determine a relative location between the first user device and a second user device, wherein the second user device is localised using at least one environment sensor of the second user device.

The instructions to trigger localisation to occur using at least one environment sensor of the first user device may comprise instructions that, when executed by the processor, cause the localisation determiner to provide data on dynamicity of different regions to the first user device.

The environment sensor may be a visual sensor.

According to a third aspect, it is provided a computer program for performing localisation of a first user device comprising an environment sensor. The computer program comprising computer program code which, when run on a localisation determiner causes the localisation determiner to: determine a dynamicity parameter indicating an extent of environment dynamicity for the first user device; determine when the dynamicity parameter indicates that the first user device is in a dynamic environment; trigger localisation to occur using localisation procedures of a cellular network to which the first user device is connected, when the first user device is determined to be in a dynamic environment; and trigger localisation to occur using at least one environment sensor of the first user device when the first user device is determined to not be in a dynamic environment.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 1 is a schematic diagram illustrating an environment in which embodiments presented herein can be applied;

FIGS. 2A-B are schematic diagrams illustrating embodiments of where a location determiner can be implemented;

DETAILED DESCRIPTION

Figure 3:
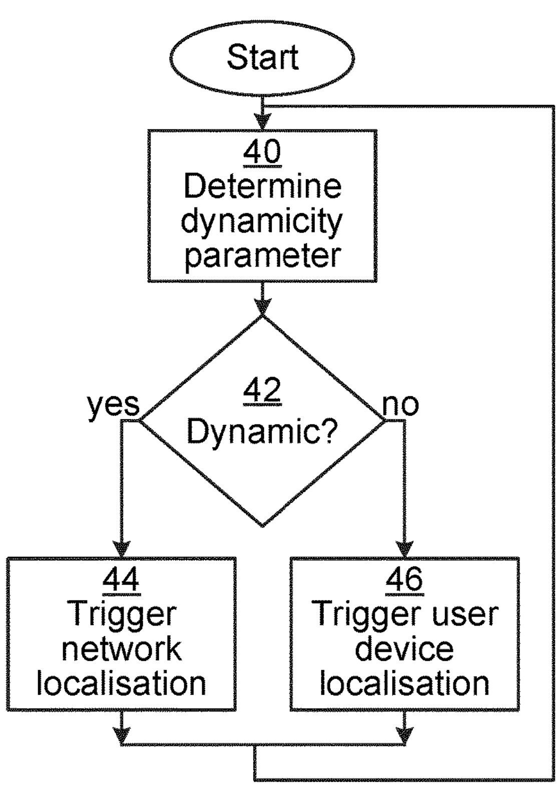
FIG. 3 is a flow chart illustrating embodiments of methods for performing localisation of a first user device.

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

According to embodiments presented herein, it is provided an improved way of localising a user device in dynamic environments, e.g. where the dynamics of the environment are influenced by people moving in the environment. In particular, the environment of the user device is evaluated to determine a dynamicity parameter. Based on this, cellular network-based localisation is utilised in dynamic environments and environment sensor-based localisation (e.g. SLAM) is utilised for static (not dynamic) environments. Environment sensor-based localisation performs better in relatively static environments while cellular based localisation performs well in dynamic environments.

FIG. 1 is a schematic diagram illustrating an environment in which embodiments presented herein can be applied. In the example illustrated in FIG. 1, there is a first user 22 with a first user device 2, a second user 23 with a second user device 3 and a third user 24 without a user device. Each user device 2, 3 comprises at least one environment sensor 4. The environment sensor 4 can be a visual sensor, e.g. one or more cameras, IR cameras, radar, etc. Alternatively or additionally, the environment sensor 4 comprises one or more depth sensors, e.g. LIDAR, radar, stereo vision cameras, etc. When depth sensors are deployed, the environment can be captured in three dimensions (3D). Each user device 2, 3 further comprises (not shown) a processor and radio communication equipment for communicating with a cellular network and optionally communication equipment for local wireless communication, e.g. Bluetooth, BLE (Bluetooth Low Energy), UWB (Ultra-wideband) etc. The user devices 2, 3 can be wearable devices, such as smart glasses, etc.

The cellular network can be any suitable type of cellular network which includes capability to locate the user devices 2, 3. The cellular network can e.g. comply with any one or a combination of 5G NR (Fifth Generation—New Radio), LTE (Long Term Evolution), LTE Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Each user device 2, 3 is capable of performing localisation as well as mapping using its at least one environment sensor, e.g. based on SLAM, as known in the art per se. By performing localisation and mapping, the user device is able to calculate its pose with respect to the physical space.

FIGS. 2A-B are schematic diagrams illustrating embodiments of where a location determiner 1 can be implemented. Looking first to FIG. 2A, the user devices 2, 3 communicate with the location determiner 1. The location determiner 1 can be located locally, in which case the communication between the user devices 2, 3 and the location determiner 1 can be based on local wireless communication. In such an embodiment, the location determiner 1 can be implemented as a local stand-alone device or integrated with any other suitable local device, e.g. wireless router, femtocell base station, alarm system, media system (e.g. media player, television), etc. Alternatively, the location determiner 1 is remotely located, in which case the communication between the user devices 2, 3 can be based on cellular network communication. In such an embodiment, the location determiner 1 can be implemented as a remote stand-alone device (e.g. as a server) or form part of any other suitable device, e.g. a core network node, an edge network node, etc.

In the embodiment of FIG. 2B, the user devices 2, 3 communicate locally with a hub 6. The hub 6, in turn, communicates via a wide-area network 7 with the location determiner 1. In this embodiment, the location determiner 1 can be implemented as a stand-alone device (e.g. as a server) or form part of any other suitable device, e.g. a core network node, an edge network node, etc. The wide-area network 7 can be based on Internet Protocol and can e.g. be the Internet. The connection between the hub 6 and the wide-area network 7 can be a wired connection (e.g. Ethernet) and/or a wireless connection, e.g. based on a cellular network connection and/or WiFi connection.

The embodiments of FIGS. 2A and 2B can be combined such that the user devices 2, 3 communicate both locally with the hub 6 as well as remotely over a cellular network with the location determiner 1.

FIG. 3 is a flow chart illustrating embodiments of methods for performing localisation of a first user device, e.g. one of the user devices of FIG. 1. The method is performed in the localisation determiner. The method can be performed for any suitable user device; the user device for which the localisation occurs is here termed the first user device.

The method can be triggered to start when the user device detects that a user needs to perform localisation (and optionally mapping), e.g. based on an application being launched which requires localisation (and optionally mapping) to be performed, e.g. an AR application.

In a determine dynamicity parameter step 40, the localisation determiner determines a dynamicity parameter indicating an extent of environment dynamicity (e.g. visual dynamicity) for the first user device.

In one embodiment, the dynamicity parameter is determined based on data, e.g. radio data, received from a cellular network to which the first user device is connected. This determination is very efficient since radio communications already occur with the first user device and this data is already available in the cellular network.

In the cellular network, different measurements can be extracted from the radio signal and are used for localisation, e.g. the signal strength, time, angle and frequency, optionally using beamforming and directional antennas or antenna arrays. Specifically, measurements such as time-of-flight (ToF), time-of-arrival (ToA) and angle-of-arrival (AoA) can be exploited for localisation.

In one embodiment, the dynamicity parameter is determined based on a current number of user devices in the vicinity of the first user device. Whenever the term 'vicinity' is used herein, this can be defined as within a certain distance (radius), or within the same physical space (e.g. room of a building).

In one embodiment, the dynamicity parameter is determined based on motion properties of the user devices in the vicinity of the first user device.

In one embodiment, the dynamicity parameter is determined based on motion properties of the first user device.

The motion properties can include one or more of linear speed of a user device, rotational speed of a user device, the trajectory of a user device, etc. The motion properties of the user devices can be determined by the network node of the cellular network using radio-based positioning techniques. Optionally, the motion properties of the user device are obtained based on network-based positioning techniques combined with other sensors of the user device. For example, IMU (Inertial Measurement Unit) data may be processed and a motion estimation can be sent to the network node of the cellular network.

In one embodiment, the dynamicity parameter is determined based on multiple corresponding input parameters collected over time. Corresponding input parameters here implies the same type input parameter, but collected at different points in time. In other words, input parameters for determining the dynamicity parameter are gathered over a period of time and the dynamicity parameter is determined as a function of these gathered input parameters. The dynamicity parameter can be based on operations on the input parameters such at average, windowed average with forgetting factor, or the largest motion dynamics of user devices that have been at a certain location during the past X hours.

In one embodiment, the dynamicity parameter is determined based on a prediction of movement of the first user device. This data can be received from a network node in the cellular network. For instance, data from the network node is used to determine the dynamicity parameter of an expected future physical space that the user of the first user device is to visit in the next X seconds. For example, the user is about to enter a future physical space being a new room or new corridor which is not yet visible to the first user device (e.g. the door is closed). In this situation, the dynamicity parameter is based on the dynamicity of the future physical space, not the current physical space of the first user device.

In one embodiment, the dynamicity parameter is denoted D. In this example, $D \in [0,1]$, where o implies a completely static environment (e.g. no person/user device other than a first user is present) and 1 implies a maximum level of dynamics (e.g. at least a certain number of moving persons/user devices are present, where the number represents a highly dynamic environment).

When the dynamicity parameter is based on the number of user devices in the vicinity of the user device, the dynamicity parameter D can be calculated according to the following. Each user device in the vicinity contributes with a constant, e.g. 0.2, whereby D=1 when the number of user devices is greater or equal to 1/constant, i.e. 5 when the constant equals 0.2.

When the dynamicity parameter is based on motion properties, the dynamicity parameter D can be calculated according to the following. Each user device contributes with a constant when its linear and/or rotational speed is above a certain threshold, where the speed inference is performed based on radio-based means or based on the motion sensors of the user device. The threshold thus defines minimum linear and/or rotational speed for a user device to be considered to contribute to a dynamic environment. The threshold can be zero, to thereby consider any linear and/or rotational speed to contribute to a dynamic environment. In one embodiment, the environmental localisation is used in a feedback loop to dynamically set the threshold(s).

In one embodiment, when the first user device is in a situation where localisation of the first user device currently based on environment sensors, the dynamicity parameter can be determined using the currently used environment sensors of the first user device. According to methods presented herein, the localisation source then changes if the environment around the first user device changes and becomes very dynamic.

The dynamicity parameters may then be recorded in a 2D (two-dimensional) or 3D (three-dimensional) map where regions of the map are labelled according to their dynamicity parameter and user device pose. When a threshold value is used for the determination in step 42 (described below), the map can be stored as a map with binary values, indicating each region to be either classified as a dynamic environment or a not dynamic (i.e. visually static) based on the threshold value.

In one embodiment, the dynamicity parameter is based on the direction of a field of view of the first user device, since environment dynamicity can vary depending on the direction that is faced. This can e.g. be based on a current user device pose and the 2D/3D map described above.

In one embodiment, a user device in the vicinity of the first user device is labelled as static under certain circumstances. This can be based on location information of that user device and its images, from which, it is identified when a human is near that user device, e.g. using object detection techniques. In such a case, when a human is not near that user device, this implies that the user device is placed in a certain location, for example to be charged, and is thus labelled to be static.

In a conditional dynamic step 42, the localisation determiner determines when the dynamicity parameter indicates that the first user device is in a dynamic environment. In one embodiment, the dynamic environment is determined based on comparing the dynamicity parameter with a threshold value.

When it is determined that there is a dynamic environment, the method proceeds to a trigger network localisation step 44. Otherwise, the method proceeds to a trigger user device localisation step 46.

In the trigger network localisation step 44, the localisation determiner triggers localisation to occur using localisation procedures of a cellular network to which the first user device is connected. In one embodiment, this is achieved by controlling radio communication in the cellular network to improve localisation of the first user device using the cellular network. In one embodiment, this comprises determining a relative location between the first user device and a second user device, wherein the second user device is localised using environment sensors for vision, depth, IMU, environment temperature, pressure, acceleration force, angle, rotation, motion, vibrations or light sensors of the second user device. In other words, localisation occurs in this embodiment using one or more environment sensors that provide the best accuracy. Alternatively or additionally, the second device can be positioned using non-cellular radio-based means (e.g. ultra-wideband, WiFi ranging, BLE ranging), while the second user device is localised with regard to the first user device using cellular, or vice-versa, depending on what is the most accurate measurement at the moment.

5G cellular networks provide outdoor and indoor positioning services. There are several localisation methods that specifically consider 5G technologies, e.g. mm-wave. Different measurements can be extracted from the radio signal and are used for localisation, e.g. the signal strength, time, angle and frequency. Moreover, network-based technologies can be used to extract information about the number of people which are currently in a certain area, since most of the people carry a mobile user device. This information is then used in the next iteration of step 40.

In one embodiment, the network radio resources are tailored for the localisation service requested by the first user device. For example, the resources can be controlled to make sure that the radio signals used for localisation are tailored for improving localisation performance. For instance, this can include reducing interference from simultaneous transmissions from other user devices and allocating resources for the first user device that have low interference, directing MIMO (Multiple Input Multiple Output) antennas to focus on the first user device, etc. As an implementation example, the network node of the cellular network can prioritise communication between the first user device and the network node for localisation purposes. The network node then schedules specific time periods that the first user device can use to exchange messages with the network node for localisation purposes only, while during those time slots no communication takes place between the other user devices and the network node.

In one embodiment, if the network resources become saturated due to the total number of user devices requesting localisation priority reaches the maximum permitted number, the user devices that do not become prioritised by the network node perform localisation and mapping using other radio technologies (e.g. UWB, Bluetooth, etc.) and by communicating with the user devices which were prioritised by the network node. In this way, the non-prioritised user devices perform a local localisation relative the localisation of prioritised user devices.

In one embodiment, if at least one other user device performs environment sensor-based localisation in the vicinity of a user device, the user device performing network-based localisation performs relative network-based localisation using radio with respect to the user device(s) performing environment sensor-based localisation. In this case, the user device performing environment sensor-based localisation becomes a localisation "leader" which provides a global localisation pose to the "follower" user devices performing network-based localisation with respect to the leader.

In the trigger user device localisation step 46, the localisation determiner triggers localisation to occur using environment sensors of the first user device. In one embodiment, this comprises providing data on dynamicity of different regions to the first user device.

The environment sensor-based localisation can be based on the inferred dynamicity parameter (from step 40) in order to increase its robustness and performance. For instance, the dynamicity parameter (or the map with plotted dynamicity parameters) can be used as an input parameter to understand which regions of the image are expected to be static and which areas of the image are expected to be dynamic. In this way, the localisation algorithm has a priori information which regions should be used to identify structural features which should be static.

In one embodiment, when the user device comprises more than one camera pointing in different directions at different locations, the location determiner determines which camera (s) should be activated for localisation, based on the location and orientation of the user device and the environment dynamicity data (optionally in the form of the map with plotted dynamicity parameters) available from step 40.

The method is repeated, optionally after an idle period, to update the environment dynamicity determination to correspond to the current environment of the first user device.

Figure 4:
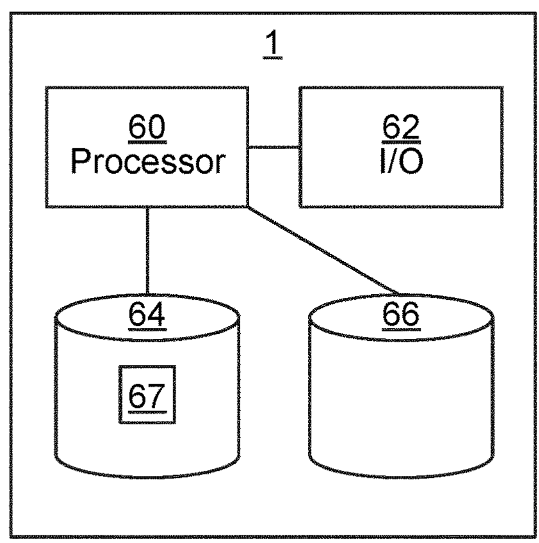
FIG. 4 is a schematic diagram illustrating components of the location determiner of FIGS. 2A-B according to one embodiment.

FIG. 4 is a schematic diagram illustrating components of the location determiner of FIGS. 2A-B according to one embodiment. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The location determiner 1 further comprises an I/O interface 62 for communicating with external and/or internal entities. Optionally, the I/O interface 62 also includes a user interface.

Other components of the location determiner 1 are omitted in order not to obscure the concepts presented herein.

Figure 5:
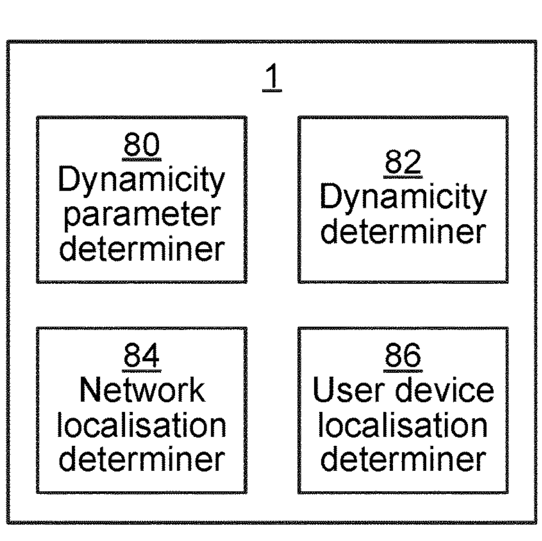
FIG. 5 is a schematic diagram showing functional modules of the location determiner of FIGS. 2A-B according to one embodiment.

FIG. 5 is a schematic diagram showing functional modules of the location determiner 1 of FIGS. 2A-B according to one embodiment. The modules are implemented using software instructions such as a computer program executing in the location determiner 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 3.

A dynamicity parameter determiner 80 corresponds to step 40. A dynamicity determiner 82 corresponds to step 42. A network localisation determiner 84 corresponds to step 44. A user device localisation determiner 86 corresponds to step 46.

Figure 6:
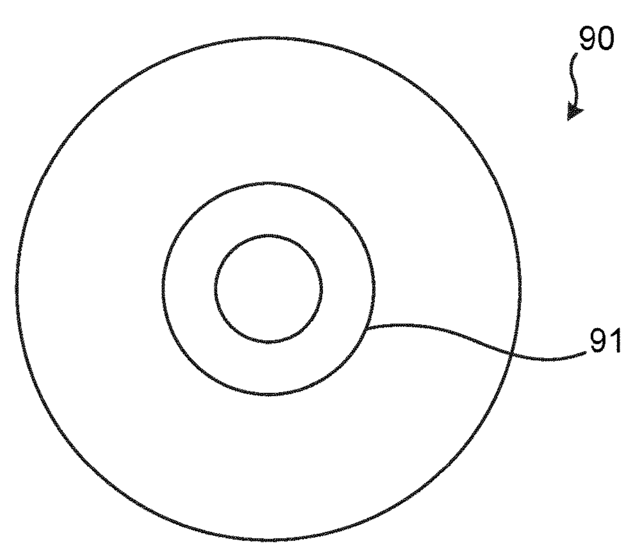
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for performing localisation of a first user device comprising an environment sensor, the method being performed in a localisation determiner and comprising the steps of:

determining a dynamicity parameter indicating an extent of environment dynamicity of the environment of the first user device based on motion properties of one or more mobile user devices, located in the vicinity of the first user device, wherein the motion properties have been gathered over a period of time, and wherein the one or more mobile user devices are associated with different persons than the person with whom the first user device is associated;

determining whether the dynamicity parameter indicates that the first user device is in a dynamic environment; and as a result of determining that the dynamicity parameter indicates that the first user device is in a dynamic environment, triggering localisation to occur using localisation procedures of a cellular network to which the first user device is connected; or as a result of determining that the dynamicity parameter indicates that the first user device is not in a dynamic environment, triggering localisation to occur using at least one environment sensor of the first user device.

2. The method of claim 1, wherein the step of determining the dynamicity parameter comprises determining the dynamicity parameter based on data received from a cellular network to which the first user device is connected.

3. The method of claim 1, wherein the step of determining when the dynamicity parameter indicates that the first user device is in a dynamic environment is based on comparing the dynamicity parameter with a threshold value.

4. The method of claim 1, wherein the step of determining a dynamicity parameter comprises determining the dynamicity parameter based on multiple corresponding input parameters collected over time.

5. The method of claim 1, wherein the step of determining a dynamicity parameter comprises determining the dynamicity parameter based on a prediction of movement of the first user device.

6. The method of claim 1, wherein the step of triggering localisation to occur using localisation procedures of a cellular network comprises controlling radio communication in the cellular network to improve localisation of the first user device using the cellular network.

7. The method of claim 1, wherein the step of triggering localisation to occur using localisation procedures of a cellular network comprises determining a relative location between the first user device and a second user device, wherein the second user device is localised using at least one environment sensor of the second user device.

8. The method of claim 1, wherein the step of triggering localisation to occur using at least one environment sensor of the first user device comprises providing data on dynamicity of different regions to the first user device.

9. The method of claim 1, wherein the environment sensor is a visual sensor.

10. The method of claim 1, wherein the step of determining a dynamicity parameter comprises determining the dynamicity parameter based on a current number of user devices in the vicinity of the first user device.

11. The method of claim 1, wherein the step of determining a dynamicity parameter comprises determining the dynamicity parameter based on motion properties of the first user device.

12. A localisation determiner for performing localisation of a first user device comprising an environment sensor, the localisation determiner comprising:

a processor; and a memory storing instructions that, when executed by the processor, cause the localisation determiner to:

determine a dynamicity parameter indicating an extent of environment dynamicity of the environment of the first user device based on motion properties of one or more mobile user devices located in the vicinity of the first user device, wherein the motion properties have been gathered over a period of time, and wherein the one or more mobile user devices are associated with different persons than the person with whom the first user device is associated;

determine whether the dynamicity parameter indicates that the first user device is in a dynamic environment;

as a result of determining that the dynamicity parameter indicates that the first user device is in a dynamic environment, trigger localisation to occur using localisation procedures of a cellular network to which the first user device is connected; or as a result of determining that the dynamicity parameter indicates that the first user device is not in a dynamic environment, trigger localisation to occur using at least one environment sensor of the first user device.

13. The localisation determiner of claim 12, wherein the instructions to determine the dynamicity parameter comprise instructions that, when executed by the processor, cause the localisation determiner to determine the dynamicity parameter based on data received from a cellular network to which the first user device is connected.

14. The localisation determiner of claim 12, wherein the instructions to determine when the dynamicity parameter indicates that the first user device is in a dynamic environment comprise instructions that, when executed by the processor, cause the localisation determiner to determine the dynamicity parameter based on comparing the dynamicity parameter with a threshold value.

15. The localisation determiner of claim 12, wherein the instructions to determine a dynamicity parameter comprise instructions that, when executed by the processor, cause the localisation determiner to determine the dynamicity parameter based on multiple corresponding input parameters collected over time.

16. The localization determiner of claim 12, wherein the instructions to determine a dynamicity parameter comprise instructions that, when executed by the processor, cause the localisation determiner to determine the dynamicity parameter based on a current number of user devices in the vicinity of the first user device.

17. The localization determiner of claim 12, wherein the instructions to determine a dynamicity parameter comprise instructions that, when executed by the processor, cause the localisation determiner to determine the dynamicity parameter based on motion properties of the first user device.

18. A non-transitory computer readable medium storing a computer program for performing localisation of a first user device comprising an environment sensor, the computer program comprising computer program code which, when run on a localisation determiner causes the localisation determiner to:

determine a dynamicity parameter indicating an extent of environment dynamicity of the environment of the first user device based on motion properties of one or more mobile user devices, located in the vicinity of the first user device, wherein the motion properties have been gathered over a period of time, and wherein the one or more mobile user devices are associated with different persons than the person with whom the first user device is associated;

determine whether the dynamicity parameter indicates that the first user device is in a dynamic environment;

as a result of determining that the dynamicity parameter indicates that the first user device is in a dynamic environment, trigger localisation to occur using localisation procedures of a cellular network to which the first user device is connected; or as a result of determining that the dynamicity parameter indicates that the first user device is not in a dynamic environment, trigger localisation to occur using at least one environment sensor of the first user device.

* * * * *